Patented June 17, 1941

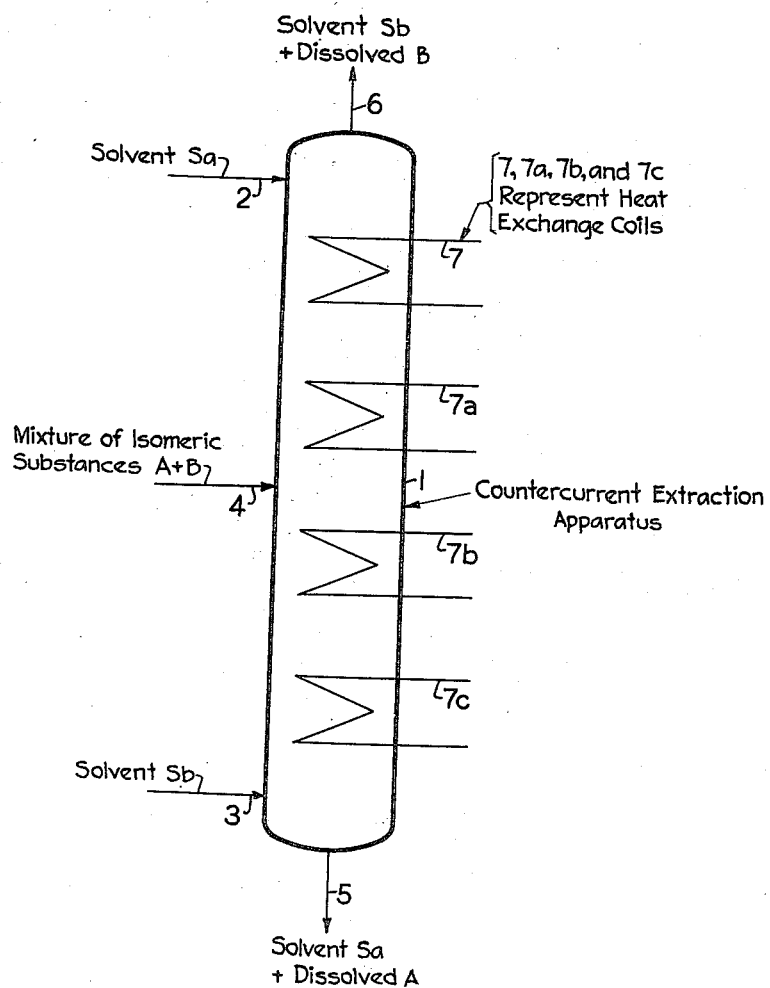

2,245,945

UNITED STATES PATENT OFFICE 2,245,945

EXTRACTION OF MIXTURES OF ISOMERIC ORGANIC COMPOUNDS

Willem Johannes Dominicus van Dijck, The Hague, and Albert Schaafsma, Amsterdam, Netherlands, assignors to Shell Development Company, San Francisco, Calif., a corporation of Delaware Application March 24, 1939, Serial No. 264,034 In the Netherlands March 30, 1938

24 Claims. (Cl. 260—575)

This invention relates to a process for the separation of mixtures of isomeric organic compounds by means of selective solvents, and is particularly concerned with the treatment of mixtures wherein the isomerism is due to a difference in the place of one or more polar groups in the molecule. Many of these mixtures cannot be separated, or can only be separated very incompletely by the known methods such as crystallization or distillation.

It is already known to effect the separation of mixtures of different substances by means of solvents. Thus, solvents have been applied for the separation of members of a homologous series, e. g. methyl alcohol and amyl alcohol, mixtures of organic substances which differ in the number of polar groups they contain, e. g. mononitrobenzene and di-nitrobenzene, and mixtures which differ in the intensity of the polar groups they contain, e. g. furfural and furfuryl alcohol. It is also known that isomeric organic compounds in which the isomerism is due to a difference in place of polar groups have different solubilities in certain solvents, and attempts have been made to concentrate one of them by treatment with such solvents (see German Patent No. 137,814). Since, however, the difference between the solubilities of such isomeric compounds is small, only a partial separation can be effected by the use of a single solvent without employing an excessive number of treating stages.

In accordance with the present invention it was found that components of such mixtures can be separated in an improved manner by extracting the mixture simultaneously with two solvents which, under the conditions of the extraction, are at least partially immiscible with one another. Such solvents thereupon form two liquid phases in which the components to be separated are distributed in different proportions.

One preferred embodiment of the invention is illustrated in the accompanying drawing, wherein *I* represents a countercurrent extraction apparatus, which may, for example, comprise a tower filled with suitable packing material, such as jack chains, balls or Raschig rings, for effecting an intimate contact between counterflowing liquids. The extraction apparatus may comprise or consist of alternate mixing and settling zones or centrifugal separators, or of any other type of apparatus which is suitable for the countercurrent contacting of one liquid phase with another. Solvents $S_a$ and $S_b$ are introduced into the countercurrent extraction zone at spaced points, such as 2 and 3, so as to provide one or more countercurrent stages between the points of introduction of the solvents. The initial mixture of isomeric substances A and B to be extracted is preferably introduced at an intermediate point in the extraction zone, such as 4; it may, however, be introduced near one end of the apparatus, if desired, together with one of the solvents.

In the extraction zone the solvent $S_a$ preferentially dissolves the substance A. The solution $S_a$ and A flows countercurrently to the solvent $S_b$, the latter solvent washing the substance B out of the $S_a$ solution or extract, which is ultimately withdrawn from one end of the extraction zone at 5. Similarly, the solvent $S_b$, which dissolves and may even preferentially dissolve the substance B, flows countercurrently to the solvent $S_a$, and the solution or extract of $S_b$ and B is withdrawn at the other end of the extraction zone at 6. The extracts withdrawn at 5 and 6 may be subjected to distillation or to washing with suitable washing agents for the separation of the solvents from the solutes. The temperature in the extraction zone may be regulated by flowing a heating or cooling medium through heat-exchange coils 7, 7a, 7b and 7c. It is possible to operate the process at a uniform temperature or to employ a temperature gradient, whereby one or both ends of the extraction zone may be at a temperature which is lower than that at an intermediate point.

It is also possible to introduce one or both of the solvents $S_a$ and $S_b$ at points removed one or more stages from the respective end of the extraction zone and to precipitate a portion of the solute in the extract between the point of introduction of the solvent and the end of the extraction zone by chilling, so as to lower the solvent power of the solvent. Alternatively, or in conjunction with such cooling, a portion of the solute separated from the extract after the removal of solvent therefrom may be returned at or near the end of the extraction zone to improve the purity of the extract.

Finally, one or more liquid phases can be wholly or partially withdrawn from the extraction zone at one or more intermediate points thereof.

The process can be applied to cyclic as well as to aliphatic mixtures of isomers. Examples of mixtures of nuclear isomers that can be separated according to the invention are mixtures of o- and p-chlornitrobenzene, o- and p-nitrophenol, o- and p-vanilline, o- and p-oxybenzaldehyde, mixtures of resorcine, pyrocatechine and hydroquinone, mixtures of o- and p-xylol, mixtures of o- and p-cetyl benzol sulphonic acid. Examples of aliphatic isomers are: mixtures of methyl propyl ketone and di-ethyl ketone, primary and secondary butyl alcohol, methyl succinic acid and glutaric acid.

By polar groups are meant groups such as OH, SH, halogen, $NO_2$, NO, CN, CNO, CNS, CO, CHO, O-alkyl, O-aryl, $NH_2$, $NR_1R_2$ (in which $R_1$ and $R_2$ are alkyl or aryl groups or represent other groups), alkyl groups, if bound to benzol rings and the like.

For the extraction of the isomeric mixtures the solvents are chosen to have such a difference in polarity as to make possible the formation of two liquid phases. According to the preferred embodiment of the invention use is made of a polar liquid as first extracting solvent and of a less polar or non-polar liquid as second extracting solvent.

Examples of polar solvents are: water, methanol, ethanol, benzyl alcohol, furfural, nitrobenzene, propionitrile.

Examples of non-polar or less polar solvents are: pentane, gasoline, benzene, kerosene, gas oil, lubricating oil, ether, trichlor ethylene, carbon tetrachloride.

With various pairs of simple extracting liquids, however, it frequently happens that, although the proportions of the amounts in which the two components to be separated are distributed in each of the phases differ sufficiently to bring about a separation, the concentrations in which the two components occur in one phase are considerably higher than those in the other phase, in other words the dissolving capacity of one solvent is appreciably greater than that of the other.

We may further explain this taking into account the following considerations.

When the mixture to be split up consists of two components A and B, which are distributed over the two extracting liquids P and S, the concentrations of the component A in the extracting agents P and S may be represented by $$C_A^P \text{ and } C_A^S$$

and those of the component B by $$C_B^P \text{ and } C_B^S$$

The ratios $$\frac{C_A^P}{C_A^S}=K_A \text{ and } \frac{C_B^P}{C_B^S}=K_B$$

respectively are generally called "coefficients of distribution."

For a separation to be possible $$\frac{C_A^P \cdot C_B^S}{C_A^S \cdot C_B^P}=\frac{K_A}{K_B}$$

should differ sufficiently from 1. If the concentrations in which the components A and B are present in the extracting liquid P differ appreciably from those in the liquid S, i. e. if $$\frac{C_A^P \cdot C_B^P}{C_A^S \cdot C_B^S}=K_A K_B$$

has a very high or a very low value, one has to take relatively large quantities of the solvent in which the components are least soluble.

It may be argued that the fact that the product $K_A K_B$, as defined in the equation $$\frac{C_A^P \cdot C_B^P}{C_A^S \cdot C_B^S}=K_A K_B$$

greatly differs from 1, e. g. is larger, may be due to one or the other of two causes:

1. The solubilities of the components A and B in one of the solvents, e. g. S, are too low;

2. The solubilities of the components A and B in the other solvent (e. g. P) are too high.

Both these factors have unwanted consequences. In the first case large quantities of the one solvent (e. g. S) will be required, consequently large apparatus will have to be used and the regeneration of this solvent will be costly. In the second case the other solvent (e. g. P) will take up so much dissolved material that the selectivity of the solvent pair will be materially reduced. As a matter of fact, it is not merely necessary in an extraction process to obtain a separation of the liquids concerned in two phases, but it is also highly desirable not to work with too concentrated solutions in order to conserve the selectivity of the solvents.

Taking into consideration that neither very high nor very low concentrations are wanted, it is clear that the ratio of the volumes of the extracting liquids should be neither very high nor very low.

It has been found that in practice the ratio of the quantities of the extracting liquids should preferably lie between 0.2 and 5.

The value of the product $$K_A K_B = \frac{C_A^P \cdot C_B^P}{C_A^S \cdot C_B^S}$$

should, therefore, not be too far from 1.

Now the control of the product of the distribution ratios may be achieved by making use of one or two extracting liquids composed of various solvents.

The two extracting liquids used in the process as a rule are immiscible or slightly miscible by virtue of a suitable difference in polarity.

If a mixture of organic isomeric substances is extracted with a weaker polar solvent together with a stronger polar solvent, it may, for example, be found that relatively too much dissolves in the more polar solvent, in which case one may reduce the solvent power of the stronger polar solvent or increase that of the less polar solvent, or take both measures.

If, for example, when operating according to a process with two extracting liquids in an extraction system, e. g. an extracting column, into which the mixture of components to be separated is introduced e. g. in the middle, it is desired to obtain the two components in the same degree of purity from a mixture of equal parts of ortho- and para-oxybenzaldehyde, using as extracting liquids on the one hand 85% ethanol and on the other hand gasoline free from aromatics and boiling between 60 and 80° C., the object aimed at can only be attained if the proportion of the non-polar and polar solvent quantities introduced at the two ends of the extraction system is about 16. The concentrations in the gasoline phase are so low that the product $K_A K_B$ differs very much from unity.

However, when using as extracting liquids on the one hand 50% ethanol and on the other hand a mixture of 60 parts by volume of the said gasoline and 40 parts by volume of benzene, the same result may be attained in an extraction system of equal construction by taking the ratio of the quantities of the non-polar and polar solvent equal to about 1.6. Increasing only the solvent power of the gasoline phase by adding benzene is not the best way, because the mutual solubility of the extracting liquids then becomes too large. The application of a relatively small ratio between the volumes of the extracting solvents frequently presents the advantage of keeping the total quantity of liquid with respect to the quantity of the mixture of components to be separated at a lower figure, such in view of the fact that the concentration of the components in the extracting liquid having a low dissolving capacity may be increased by adding a liquid with a greater dissolving capacity; of this extracting liquid a smaller amount is required, whilst the amount of the other extracting liquid remains constant.

In certain cases the reverse of the measures taken with the ethanol and gasoline solvents may be desirable, i. e. the more polar solvent may be diluted with a solubility promoter and/or the less polar solvent may be diluted with a solubility reducer.

Changing the composition of the two solvent liquids also influences their mutual solubility. In general a high mutual solubility is unwanted, since this reduces the selectivity. By using extracting liquids composed of mixtures of solvents a reduction of the mutual solubility of these liquids may in some cases be obtained. The reverse is, however, also possible. In the preceding example gasoline with an addition of benzene was used in conjunction with ethyl alcohol with an addition of water.

Water and gasoline are immiscible owing to a large difference in polarity, whereas the difference in polarity between ethyl alcohol and benzene is too small to give demixing. The first solvent pair has good selectivity, but practically no solvent power, whereas water + a large amount of alcohol and gasoline + a large amount of benzene have a good solvent power, but, since they tend to mix completely, have a bad selectivity.

The extracting liquids used in the above example have intermediate compositions.

In general several cases may present themselves, viz.:

| Product of distribution ratios $K_A K_B = \dfrac{C_A^P}{C_A^S} \cdot \dfrac{C_B^P}{C_B^S}$ | Solubilities of material to be treated | | Measures to be taken Change of solubilities | |
|---|---|---|---|---|
| | In P | In S | In P | In S |
| Too high | +++<br>++<br>++<br>+<br>− | ++<br>+<br>−<br>−<br>−− | 0<br>−<br>−<br>0<br>0<br>+ | *<br>*<br>0 preferably.<br>* preferably.<br>*<br>* |
| Sufficient | ++<br>+<br>− | ++<br>+<br>− | 0<br>−<br>0<br>+ | 0<br>†<br>0<br>* |
| Too low | ++<br>+<br>−<br>−− | +++<br>++<br>++<br>+<br>− | +<br>0<br>0<br>+<br>+<br>+ | 0<br>†<br>† preferably.<br>† preferably.<br>0<br>0<br>* |

In the above table:
+++ Means very high.
++ More than sufficient.
+ Sufficient.
− Too low.
−− Very low.
* Increase.
0 No change.
† Decrease.

To obtain the necessary changes in solubility the following rules may be applied:

1. The addition of a more/less polar substance to a certain solvent will increase/reduce the solubility of a solute which is more polar than the solvent.

2. The addition of a more/less polar substance to a certain solvent will reduce/increase the solubility of a solute which is less polar than the solvent.

Preferably the process is carried out in such a manner that the two extracting liquids are made to flow in countercurrent along or through each other, as described with reference to the drawing; but a single stage extraction may also be employed. It may be carried out continuously or in batch operations.

In case it is desired to split up mixtures of more than two isomeric organic compounds, e. g. mixtures consisting of components A, B and C, the separation between A+B on the one hand and C on the other hand, A+C on the one hand and B on the other hand, or between A on the one hand and B+C on the other hand, may be effected—according to requirement—by varying the conditions, e. g. the quantities and the nature of the extracting liquids, the temperature of the extraction treatment and the like.

The extracting liquids and the extraction temperatures are so chosen as to insure that all the material in the extraction system is in the liquid state.

If the mixtures to be split up contain more than two components or groups of components, a component or group of components already present in the mixture to be split up (which may or may not be an isomer of the substances to be separated) may serve as one of the extracting liquids, it being in such case only necessary to extract the initial mixture with one added solvent.

When one component or group of components with respect to the other component or group of components occurs in the mixtures to be split up in a very small amount, one may, before applying the process according to the invention, if desired, remove a portion of the component or group of components present in excess in some known manner, e. g. by crystallization.

EXAMPLE I

Crude vanilline was introduced in the middle of an extraction system of 9 stages, each of which consisted of a mixing and a settling space. This feed stock chiefly consisted of paravanilline, orthovanilline and guayacol, approximately in the ratio 80:10:10. The stock was diluted with 20% by weight of 60% aqueous ethanol. A 10-fold quantity (by volume with respect to the quantity of product to be split up) of a mixture of 40 parts by volume gasoline free from aromatics and boiling between 60 and 80° C. and 60 parts by volume of benzene was introduced at one end of the extraction system, whilst at the other end there was introduced a 6.5-fold quantity of 50% aqueous ethanol. From the alcohol phase leaving the system a product was obtained, after distillation of the solvent, in a yield of 81% by weight calculated on crude vanilline, which product consisted for about 99% by weight of paravanilline and had a melting point of 77° C. A paravanilline of excellent commercial quality was prepared from this product by recrystallization from water.

EXAMPLE II

A mixture of equal parts of ortho- and para-nitrophenol (melting points 45° C. and 114° C. respectively) was introduced in the middle of an extraction system of 7 stages, each of which stages consisted of a mixing and a settling space. At one end of the extraction system there was introduced 12 litres of 50% aqueous ethanol per kg. of feed stock to be split up, at the other end 4 litres of a mixture of equal parts by volume of gasoline free from aromatics and boiling between 60 and 80° C., and benzene. From the alcohol phase leaving the system a product with a melting point of 112.5° C. (i. e. 98.5% paranitrophenol) was obtained after distillation of the alcohol, whilst the gasoline phase, after removal of the gasoline, yielded a product with a melting point of 44.2° C. (i. e. 98.5% orthonitrophenol).

EXAMPLE III

*Separation of ortho- and para-dihydroxy benzene*

100 cm.³ water and 100 cm.³ of a mixture of equal volumes of di-ethyl ether and gasoline were added to 20 g. of a mixture consisting of 75% by weight ortho-dihydroxy benzene and 25% by weight para-dihydroxy benzene. After having been shaken at 20° C., the phases were separated and the solvents removed. The water phase (volume 111 cm.³) was found to contain 13.2 g. dissolved substance, the ether-gasoline phase (volume 103 cm.³) 6.8 g.

The products obtained had the following compositions: in the water phase: 64% by wt. ortho, 36% by wt. para; in the ether-gasoline phase: 95% by wt. ortho, 5% by wt. para.

From these data it follows that the distribution coefficient (ratio of the concentration in water to the concentration in gasoline/ether) in these cases was:

Ortho compound _____ 1.2
Para compound _____ 13 i. e. by making use of a multi-stage extraction system and applying, for example, the countercurrent principle, one may separate the mixture completely into its components.

EXAMPLE IV

*Separation of ortho- and para-hydroxy benzaldehydes*

100 cm³ alcohol of 50% concentration and 100 cm.³ gasoline-benzene 60/40 were added to 20 g. of a mixture consisting of 50% by weight ortho-hydroxy benzaldehyde (salicylic aldehyde) and 50% by weight para-hydroxy benzaldehyde.

After having been shaken at 20° C. the following phases were obtained: 106 cm.³ water-alcohol phase, containing 11.8 g. solid substance and 104 cm.³ gasoline-benzene phase, containing 8.2 g. solid substance.

By determination of the pour points the products were found to have the following compositions: in the water-alcohol phase: 20% by wt. ortho, 80% by wt. para; in the benzene-gasoline phase: 84% by wt. ortho, 16% by wt. para.

The distribution coefficients are:

For the ortho compound _____ 0.34
For the para compound _____ 7.1 so that this mixture too can be separated in a multi-stage extraction process.

This may be further elucidated with reference to an intermittent countercurrent extraction carried out in seven separating funnels. The initial material was introduced in the middle of the system. The extraction was continued until the concentrations had become stationary. Every time there were introduced in the 4th stage: 5 cm.³ initial material (60% para + 40% ortho), with an addition of 1 cm.³ alcohol to liquefy the product; in the 1st stage: 18 cm.³ alcohol of 50% concentration; in the 7th stage: 30 cm.³ gasoline-benzene.

The product entrained with the gasoline phase was found to solidify at −1 to −2° C., from which it may be concluded to be ortho-hydroxy benzaldehyde of about 99% concentration. The product entrained with the alcohol phase was found to have a solidification point of 114–115° C., which points to a content of 97–99% of the para compound.

EXAMPLE V

*Separation of ortho- and para-methoxy phenol*

100 cm.³ alcohol of 60% concentration and 100 cm.³ of a mixture of gasoline+benzene 50/50 were added to 20 g. of a mixture of equal parts by weight of the above compounds.

The phases obtained were: 107 cm.³ of a water-alcohol phase, containing 13.0 g. dissolved substance and 109 cm.³ gasoline-benzene phase, containing 7.0 g. dissolved substance.

The compositions of the products were found to be: in water-alcohol phase: 58% para, 42% ortho; in benzene-gasoline phase: 48% para, 52% ortho.

The distribution coefficients were:

Para compound _____ 2.4
Ortho compound _____ 1.6

In this case a multi-stage extraction system, consisting of about 50 ideal stages, brings about a complete separation between the two components.

EXAMPLE VI

*Separation of ortho- and para-ethoxy aniline*

20.2 g. of a mixture of equal parts of the said compounds were dissolved in 100 cm.³ ethanol (50% concentration) and 100 cm.³ gasoline-benzene (90/10) and shaken at room temperature.

The phases obtained were: 106 cm.³ alcohol phase, containing 12.5 g. product and 108 cm.³ gasoline-benzene phase, containing 7.6 g. product.

The compositions were found by determination of the points of demiscibility with an equal volume of heptane, to which end a curve showing the relation between these points and the composition for various mixtures was first drawn.

They were found to be: for the product of the aqueous alcohol phase: 35% by wt. of the ortho compound, 65% by wt. of the para compound; for the product of the gasoline-benzene phase: 78% by wt. of the ortho compound, 22% by wt. of the para compound.

The distribution coefficients are: for the ortho compound 0.75, for the para compound 4.8.

In about 13 ideal stages a complete separation between the components can be attained.

EXAMPLE VII

*Separation of propane 1.1 dicarbonic acid and propane 1.3 dicarbonic acid*

The distribution coefficients of the said acids over ether/water were 1.39 and 0.215 respectively, over ethyl acetate/water 2.48 and 0.75 respectively.

Both solvent pairs are, therefore, suitable.

The following substances were introduced per unit of time into a countercurrent extraction system consisting of 13 stages: in the 7th stage of mixture of 2.5 g. of the 1.1 carbonic acid and 2.5 g. of the 1.3 carbonic acid; in the 1st stage 50 cm.³ ethyl acetate and in the last stage 68.5 cm.³ water.

From the first stage an aqueous solution of the propane 1.3 carbonic acid flows off. The 1.3 carbonic acid was 90% pure. The 1.1 carbonic acid leaves the apparatus, dissolved in ethyl acetate. It was 93% pure.

We claim as our invention:

1. A process for fractionating a mixture containing essentially isomeric organic compounds wherein the isomerism is due to a difference in the position of at least one polar group in the molecule, comprising the steps of extracting said mixture simultaneously with two solvents for said isomers, which solvents under the conditions of the process and in the presence of the mixture are substantially inert, differ in polarity and are at least partially immiscible with each other, thereby forming two separate phases in which said isomers are distributed in different proportions, and separating said phases.

2. The process according to claim 1, in which the volumetric ratio of the solvents is between 0.2 and 5.0.

3. The process according to claim 1, in which the initial mixture contains said isomers and a third component which is a solvent for at least one of said isomers and said third component is employed as one of said solvents.

4. A process for fractionating a mixture containing essentially isomeric organic compounds, wherein the isomerism is due to a difference in the position of at least one polar group in the molecule, comprising the steps of extracting said mixture simultaneously with a polar solvent and with a solvent which is less polar than said polar solvent, which solvents are solvents for said isomers and are substantially inert and which under the conditions of the process and in the presence of the mixture, are at least partially immiscible with each other, thereby forming two separate phases in which said isomers are distributed in different proportions, and separating said phases.

5. The process according to claim 4, in which the solvent which is less polar than said polar solvent is substantially non-polar.

6. A process for fractionating a mixture containing essentially isomeric organic compounds, wherein the isomerism is due to a difference in the position of at least one polar group in the molecule, comprising the steps of extracting said mixture simultaneously with two solvents for said isomers, which solvents under the conditions of the process and in the presence of the mixture are at least partially immiscible with each other, are substantially inert and differ in polarity and thus form two liquid phases in which the isomers are distributed in different proportions by introducing said solvents at spaced points in a countercurrent extraction zone, counterflowing said solvents through said extraction zone, introducing the mixture into said counterflowing solvents, thereby producing counterflowing extracts containing said solvents in which said isomers are distributed in different proportions, and withdrawing said extracts at spaced points in said extraction zone.

7. The process according to claim 6, in which the mixture to be fractionated is dissolved in at least a portion of one of said solvents before introduction into the extraction zone.

8. The process according to claim 6, in which the mixture to be fractionated is introduced into the extraction zone at a point intermediate between the points of introduction of the solvents.

9. A process for fractionating a mixture containing essentially isomeric organic compounds, wherein the isomerism is due to a difference in the position of at least one polar group in the molecule and a third component which is a solvent for at least one of said isomers, comprising the steps of extracting said mixture by flowing it countercurrently to a solvent for said isomers which solvent, under the conditions of the process is at least partially immiscible with and differs in polarity from said third component, is substantially inert and which forms, together with said third component, two liquid phases in which the isomers are distributed in different proportions, thereby producing counterflowing extracts containing said third component and said solvent, in which said isomers are distributed in different proportions, and withdrawing said extracts at spaced points in said extraction zone.

10. A process for fractionating a mixture containing essentially isomeric phenols which contain at least one polar group in addition to the hydroxyl group, wherein the isomerism of said phenols is due to a difference in the position of at least one polar group in the molecule, comprising extracting said mixture simultaneously with two solvents which under the conditions of the process and in the presence of the mixture are at least partially immiscible with each other, are substantially inert and which differ in polarity, thereby forming two liquid phases in which said isomers are distributed in different proportions, and separating said phases.

11. A process for fractionating a mixture containing essentially isomeric alkoxy phenols wherein the isomerism is due to a difference in the position of at least one polar group in the molecule, comprising extracting said mixture simultaneously with two solvents which under the conditions of the process and in the presence of the mixture are at least partially immiscible with each other, are substantially inert and which differ in polarity, thereby forming two liquid phases in which said isomers are distributed in different proportions, and separating said phase.

12. A process for fractionating a mixture containing essentially isomeric aldo-phenols wherein the isomerism is due to a difference in the position of at least one polar group in the molecule, comprising extracting said mixture simultaneously with two solvents which under the conditions of the process and in the presence of the mixture are at least partially immiscible with each other, are substantially inert and which differ in polarity, thereby forming two liquid phases in which said isomers are distributed in different proportions, and separating said phases.

13. A process for concentrating paravanilline, comprising the steps of extracting a crude vanilline containing essentially paravanilline and orthovanilline simultaneously with a polar solvent and a non-polar solvent, said solvents under the conditions of the process and in the presence of the mixture are at least partially immiscible with each other, thereby causing the formation of liquid phases in which the paravalline and the orthovanilline are distributed in different proportions, and separating said phases.

14. The process according to claim 13, in which the polar solvent consists predominantly of aqueous ethanol and the non-polar solvent consists predominantly of a mixture of low-boiling aliphatic and aromatic hydrocarbons.

15. A process for fractionating a mixture containing essentially isomeric nitro-phenols wherein the isomerism is due to a difference in the position of at least one polar group in the molecule, comprising extracting said mixture simultaneously with two solvents which under the conditions of the process and in the presence of the mixture are at least partially immiscible with each other, are substantially inert and which differ in polarity, thereby forming two liquid phases in which said isomers are distributed in different proportions, and separating said phases.

16. A process for separating paranitrophenol and orthonitrophenol from a mixture containing essentially the same, comprising the steps of extracting said mixture simultaneously with a polar solvent and a non-polar solvent, said solvents under the conditions of the process and in the presence of the mixture are at least partially immiscible with each other, thereby causing the formation of liquid phases in which the paranitrophenol and the orthonitrophenol are distributed in different proportions, and separating said phases.

17. The process according to claim 16, in which the polar solvent consists predominantly of aqueous ethanol and the non-polar solvent consists predominantly of a mixture of low-boiling aliphatic and aromatic hydrocarbons.

18. A process for fractionating a mixture containing essentially isomeric amino benzenes which contain at least one polar group in addition to the amino group, wherein the isomerism of said amino benzenes is due to a difference in the position of at least one polar group in the molecule, comprising extracting said mixture simultaneously with two solvents which under the conditions of the process and in the presence of the mixture are at least partially immiscible with each other, are substantially inert and which differ in polarity, thereby forming two liquid phases in which said isomers are distributed in different proportions, and separating said phases.

19. A process for separating ortho- and para-ethoxy aniline from a mixture containing essentially the same, comprising the steps of extracting said mixture simultaneously with a polar solvent and a non-polar solvent, said solvents under the conditions of the process and in the mixture are at least partially immiscible with each other, thereby causing the formation of liquid phases in which the ortho- and para-ethoxy aniline are distributed in different proportions, and separating said phases.

20. The process for fractionating a mixture containing essentially isomeric organic compounds wherein the isomerism is due to a difference in the position of at least one polar group in the molecule, comprising the steps of extracting said mixture simultaneously with a hydrocarbon solvent and with a polar solvent containing a polar compound having a hydroxyl group, which solvents under the conditions of the process and in the presence of each other, are at least partially immiscible with each other and are adapted to form two liquid phases, thereby forming two separate phases in which said isomers are distributed in different proportions, and separating said phases.

21. The process of claim 20 wherein said polar solvent is an aliphatic alcohol solvent.

22. The process for fractionating a mixture containing essentially vanillin and paravanillin, comprising the steps of extracting said mixture simultaneously with a hydrocarbon solvent and an aliphatic alcohol solvent, which solvents under the conditions of the process and in the presence of each other, are at least partially immiscible with each other and are adapted to form two liquid phases, thereby forming two separate phases in which said isomers are distributed in different proportions, and separating said phases.

23. The process for fractionating a mixture containing essentially para nitrophenol and ortho nitrophenol, comprising the steps of extracting said mixture simultaneously with a hydrocarbon solvent and an aliphatic alcohol solvent, which solvents under the conditions of the process and in the presence of each other, are at least partially immiscible with each other and are adapted to form two liquid phases, thereby forming two separate phases in which said isomers are distributed in different proportions, and separating said phases.

24. The process for fractionating a mixture containing essentially ortho ethoxyaniline and para ethoxyaniline, comprising the steps of extracting said mixture simultaneously with a hydrocarbon solvent and an aliphatic alcohol solvent, which solvents under the conditions of the process and in the presence of each other, are at least partially immiscible with each other and are adapted to form two liquid phases, thereby forming two separate phases in which said isomers are distributed in different proportions, and separating said phases.

WILLEM JOHANNES
DOMINICUS VAN DIJCK.
ALBERT SCHAAFSMA.